United States Patent
Hung et al.

(10) Patent No.: US 11,206,157 B1
(45) Date of Patent: Dec. 21, 2021

(54) SIGNAL RECEIVING CIRCUIT, MEMORY STORAGE DEVICE AND CALIBRATION METHOD OF EQUALIZER CIRCUIT

(71) Applicant: PHISON ELECTRONICS CORP., Miaoli (TW)

(72) Inventors: Zhen-Hong Hung, New Taipei (TW); Sheng-Wen Chen, Hsinchu County (TW); Shih-Yang Sun, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/067,776

(22) Filed: Oct. 12, 2020

(30) Foreign Application Priority Data

Aug. 20, 2020 (TW) ................................ 109128364

(51) Int. Cl.
*H04L 25/03* (2006.01)
*H04L 7/00* (2006.01)

(52) U.S. Cl.
CPC ............ *H04L 25/03* (2013.01); *H04L 7/0079* (2013.01); *H04L 25/03019* (2013.01); *H04L 25/03885* (2013.01)

(58) Field of Classification Search
CPC ............ H04L 25/003; H04L 25/03006; H04L 25/03012; H04L 25/03019; H04L 25/03885; H04L 7/0079; H04L 25/03
See application file for complete search history.

(56) References Cited

U.S. PATENT DOCUMENTS 7,254,345 B2 * 8/2007 Suzaki ................. H04B 10/695 398/202
9,467,314 B1 * 10/2016 Wei .................... H04L 25/03057

FOREIGN PATENT DOCUMENTS

| CN | 106448719 | 2/2017 |
| TW | I365615 | 6/2012 |
| TW | I642063 | 11/2018 |

OTHER PUBLICATIONS

"Office Action of Taiwan Counterpart Application", dated Apr. 28, 2021, p. 1-p. 7.
"Office Action of China Counterpart Application", dated Aug. 2, 2021, p. 1-p. 10.

* cited by examiner

*Primary Examiner* — Betsy Deppe
(74) *Attorney, Agent, or Firm* — JCIPRNET

(57) ABSTRACT

A calibration method of an equalizer circuit for a memory storage device is disclosed. The calibration method includes: receiving a first signal; adjusting, by the equalizer circuit, the first signal according to a control parameter to output a second signal; generating a first sampling signal according to a first reference signal and the second signal, wherein the first sampling signal reflects data transmitted by the first signal; and generating a second sampling signal according to a second reference signal and the second signal and adjusting the control parameter according to the second sampling signal to calibrate the equalizer circuit, wherein a voltage value of the first reference signal is different from a voltage value of the second reference signal.

21 Claims, 6 Drawing Sheets

SIGNAL RECEIVING CIRCUIT, MEMORY STORAGE DEVICE AND CALIBRATION METHOD OF EQUALIZER CIRCUIT

CROSS-REFERENCE TO RELATED APPLICATION

This application claims the priority benefit of Taiwan application serial no. 109128364, filed on Aug. 20, 2020. The entirety of the above-mentioned patent application is hereby incorporated by reference herein and made a part of this specification.

BACKGROUND

Technical Field

The disclosure relates to a calibration technique of an electronic circuit, and more particularly, to an execution method of a signal receiving circuit, a memory storage device and a calibration method of an equalizer circuit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

Generally speaking, in order to overcome the channel loss during signal transmission, the receiving end circuit will use equalizer to compensate the received signal and use the clock and data recovery (CDR) circuit to perform phase lock on the received signal. In addition, for different channel states, the parameters used by the equalizer need to be adjusted accordingly to achieve better modulation efficiency. Traditionally, a calibration circuit can be set with the equalizer to adjust the parameters used by the equalizer. However, the traditional equalizer calibration circuit requires additional operations such as signal voltage division, filtering, and phase detection, which makes the circuit design more complicated. In addition, the traditional equalizer calibration circuit is not easy to find the boundary between the high frequency component and the low frequency component of the signal, and it is easily affected by noise and cause malfunction. Furthermore, the traditional equalizer calibration circuit is often unable to effectively calibrate the low frequency signal in a low loss channel.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The present disclosure provides a calibration method of a signal receiving circuit, a memory storage device and an equalizer circuit, which can improve the calibration efficiency of the equalizer circuit.

A signal receiving circuit is provided according to an exemplary embodiment of the disclosure. The signal receiving circuit includes an equalizer circuit, a clock and data recovery (CDR) circuit, and a calibration control circuit. The equalizer circuit is configured to receive a first signal and adjust the first signal according to a control parameter to output a second signal. The clock and data recovery circuit is coupled to the equalizer circuit and configured to generate a first sampling signal according to a first reference signal and the second signal, wherein the first sampling signal reflects data transmitted by the first signal. The calibration control circuit is coupled to the equalizer circuit and the clock and data recovery circuit. The calibration control circuit is configured to generate a second sampling signal according to a second reference signal and the second signal and adjust the control parameter according to the second sampling signal to calibrate the equalizer circuit, and a voltage value of the first reference signal is different from a voltage value of the second reference signal.

A memory storage device is provided according to an exemplary embodiment of the disclosure. The memory storage device includes a connection interface unit, a rewritable non-volatile memory module, a memory control circuit unit, and a signal receiving circuit. The connection interface unit is configured to couple a host system. The memory control circuit unit is coupled to the connection interface unit and the rewritable non-volatile memory module. The signal receiving circuit is disposed in the connection interface unit. The signal receiving circuit includes an equalizer circuit and the signal receiving circuit is configured to receive a first signal. The equalizer circuit is configured to adjust the first signal according to a control parameter to output a second signal. The signal receiving circuit is further configured to generate a first sampling signal according to a first reference signal and the second signal, wherein the first sampling signal reflects data transmitted by the first signal. The signal receiving circuit is further configured to generate a second sampling signal according to a second reference signal and the second signal and adjust the control parameter according to the second sampling signal to calibrate the equalizer circuit, and a voltage value of the first reference signal is different from a voltage value of the second reference signal.

A calibration method of an equalizer circuit for a memory storage device is provided according to an exemplary embodiment of the disclosure. The calibration method includes: receiving a first signal; adjusting, by the equalizer circuit, the first signal according to a control parameter to output a second signal; generating a first sampling signal according to a first reference signal and the second signal, wherein the first sampling signal reflects data transmitted by the first signal; and generating a second sampling signal according to a second reference signal and the second signal and adjusting the control parameter according to the second sampling signal to calibrate the equalizer circuit, wherein a voltage value of the first reference signal is different from a voltage value of the second reference signal.

Based on the above, after receiving the first signal, the equalizer circuit can adjust the first signal according to the control parameter and output the second signal. Then, the first sampling signal can be generated according to the first reference signal and the second signal to reflect the data transmitted by the first signal. In addition, the second sampling signal can be generated according to the second reference signal and the second signal, and the control parameter can be adjusted according to the second sampling signal to calibrate the equalizer circuit. In particular, the voltage value of the first reference signal is different from the voltage value of the second reference signal. In this way, the calibration efficiency for the equalizer circuit can be effectively improved.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
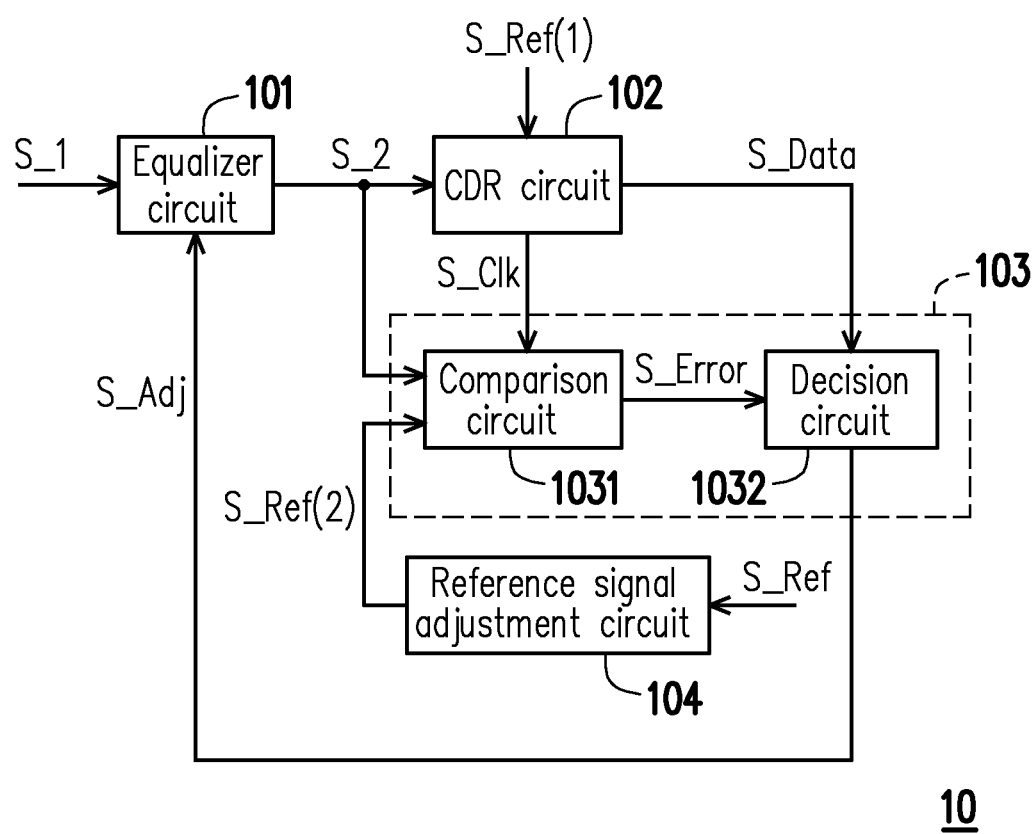
FIG. 1 is a schematic diagram of a signal receiving circuit according to an exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A plurality of exemplary embodiments are provided below to describe the disclosure, though the disclosure is not limited to the provided exemplary embodiments, and the exemplary embodiments can also be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, a term "signal" refers to at least a current, a voltage, an electric charge, a temperature, data or any other one or a plurality of signals.

FIG. 1 is a schematic diagram of a signal receiving circuit according to an exemplary embodiment of the present disclosure. Please refer to FIG. 1, a signal receiving circuit 10 includes an equalizer circuit 101, a clock and data recovery (CDR) circuit 102, and a calibration control circuit 103.

The equalizer circuit 101 can receive a signal (also referred to as a first signal) S_1. The equalizer circuit 101 can adjust the signal S_1 according to at least one control parameter and generate a signal (also referred to as a second signal) S_2. For example, the equalizer circuit 101 can compensate the signal S_1 according to the control parameter to generate the signal S_2. The signal S_2 can reflect an adjustment result of the signal S_1 with the control parameter currently used by the equalizer circuit 101. In addition, the control parameter may include VGA parameters, HFPK parameters, and/or LFPK parameters used by the equalizer circuit 101, and the adjustable control parameters are not limited thereto.

In an exemplary embodiment, the equalizer circuit 101 may include at least one of a linear equalizer, a continuous-time linear equalizer (CTLE), an infinite impulse response circuit (IIR), and a decision feedback equalizer (DFE). The equalizer circuit 101 can compensate (e.g., amplify) the signal S_1 according to the current channel state to generate the signal S_2.

The clock and data recovery circuit 102 is coupled to the equalizer circuit 101. The clock and data recovery circuit 102 can receive the signal S_2 and a signal (also referred to as a first reference signal) S_Ref(1). The clock and data recovery circuit 102 can generate a signal (also referred to as a first sampling signal) S_Data according to the signal S_Ref(1) and the signal S_2. The signal S_Data can reflect the data transmitted by the signal S_1 (for example, the bit "1" or "0").

In an exemplary embodiment, the clock and data recovery circuit 102 can sample the signal S_2 according to a signal (also referred to as a clock signal or a high-speed clock signal) S_Clk and the signal S_Ref(1) to generate the signal S_Data. The signal S_Clk can provide a sampling clock for sampling the signal S_2. A voltage value of the signal S_Ref(1) can be used as a reference voltage level (also called a first reference voltage level) to compare with a voltage value of the signal S_2. For example, in response to each rising edge (and/or falling edge) of the signal S_Clk, the voltage value of the signal S_2 can be compared with the voltage value of the signal S_Ref(1). The signal S_Data can be generated according to each comparison result between the voltage value of the signal S_2 and the voltage value of the signal S_Ref(1) (that is, the voltage value of the signal S_2 is greater than or less than the voltage value of the signal S_Ref(1)) to reflect the bit data transmitted by the original signal S_1.

In an exemplary embodiment, the clock and data recovery circuit 102 can also perform a phase lock on the signal S_2 to generate the signal S_Data. For example, the clock and data recovery circuit 102 may include a phase detection circuit (not shown), a charging circuit (not shown), and a voltage controlled oscillator (not shown). Through the joint operation of the phase detection circuit, the charging circuit and the voltage controlled oscillator, the clock and data recovery circuit 102 can gradually keep the phase of the signal S_2 being synchronized with the phase of the signal S_Data. In addition, the clock and data recovery circuit 102 can transmit the signal S_Clk to the calibration control circuit 103.

The calibration control circuit 103 is coupled to the equalizer circuit 101 and the clock and data recovery circuit 102. The calibration control circuit 103 can receive a signal (also referred to as a second reference signal) S_Ref(2), the signal S_2, and the signal S_Clk. It should be noted that the voltage value of the signal S_Ref(1) is different from a voltage value of the signal S_Ref(2). The calibration control circuit 103 can generate a signal (also called a second sampling signal) S_Error according to the signal S_Ref(2), the signal S_2, and the signal S_Clk.

In an exemplary embodiment, the calibration control circuit 103 can sample the signal S_2 according to the signal S_Clk and the signal S_Ref(2) to generate the signal S_Error. The signal S_Clk can provide a sampling clock for sampling the signal S_2. The voltage value of the signal S_Ref(2) can be used as a reference voltage level (also called a second reference voltage level) to compare with the voltage value of the signal S_2. For example, in response to each rising edge (and/or falling edge) of the signal S_Clk, the voltage value of the signal S_2 can be compared with the voltage value of the signal S_Ref(2). The signal S_Error can be generated based on each comparison result between the voltage value of the signal S_2 and the voltage value of the signal S_Ref(2) (that is, the voltage value of the signal S_2 is greater than or less than the voltage value of the signal S_Ref(2)).

The calibration control circuit 103 can adjust the control parameter used by the equalizer circuit 101 according to the signal S_Error, so as to calibrate the equalizer circuit 101. For example, the calibration control circuit 103 can send a signal (also referred to as an adjustment signal) S_Adj to the equalizer circuit 101 according to the signal S_Error to adjust the control parameter used by the equalizer circuit 101 through the signal S_Adj. For example, the compensation capability of the equalizer circuit 101 for the signal S_1 can be adjusted by adjusting the control parameter of the equalizer circuit 101. The equalizer circuit 101 can continuously modulate and compensate the signal S_1 to generate the signal S_2 according to the dynamically adjusted control parameter.

In an exemplary embodiment, the calibration control circuit 103 may include a programmable general-purpose or special-purpose microprocessor, an embedded controller, a digital signal processor (DSP), a programmable controller, a special application integrated circuit (ASIC), a programmable logical device (PLD) or other similar devices or a combination of these devices.

In an exemplary embodiment, the signal receiving circuit 10 further includes a reference signal adjustment circuit 104. The reference signal adjustment circuit 104 is coupled to the calibration control circuit 103. The reference signal adjustment circuit 104 is configured to adjust the voltage value of the signal S_Ref(2). For example, the reference signal adjustment circuit 104 may receive a signal (also referred to as a default reference signal) S_Ref. The signal S_Ref may have a predetermined voltage value. The reference signal adjustment circuit 104 can generate the signal S_Ref(2) by increasing or decreasing the voltage value (i.e., the predetermined voltage value) of the signal S_Ref. The reference signal adjustment circuit 104 can provide the signal S_Ref(2) to the calibration control circuit 103.

In an exemplary embodiment, the reference signal adjustment circuit 104 can also be coupled to the clock and data recovery circuit 102 and can provide the signal S_Ref(1) to the clock and data recovery circuit 102. For example, the signal S_Ref(1) can be generated by increasing or decreasing the voltage value of the signal S_Ref.

In an exemplary embodiment, the signal S_2 is an oscillating signal. In an exemplary embodiment, the voltage value of the signal S_Ref(2) is farther away from the oscillation center voltage of the signal S_2 than the voltage value of the signal S_Ref(1). For example, the oscillation center voltage of the signal S_2 refers to a voltage level at an oscillation center of the signal S_2.

Figure 2:
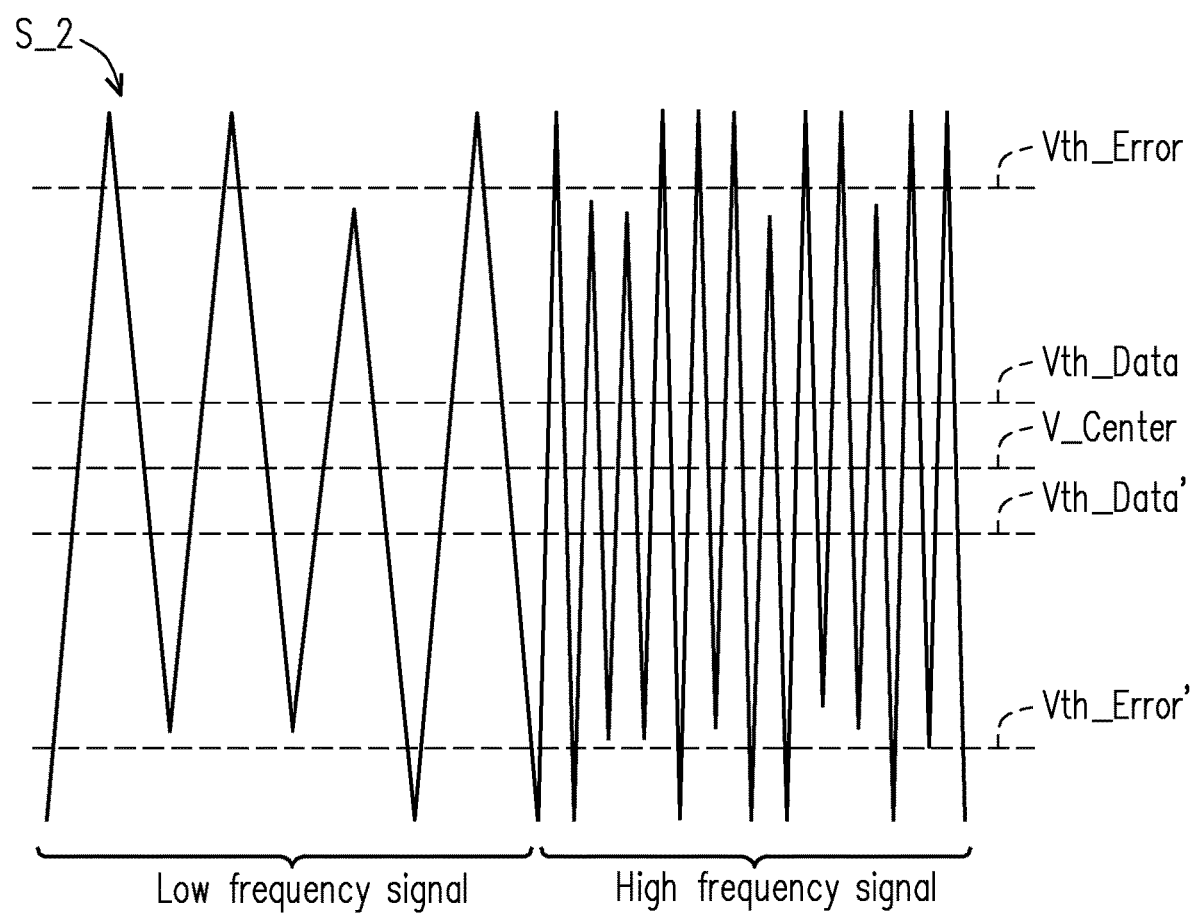
FIG. 2 is a schematic diagram of a second signal according to an exemplary embodiment of the present disclosure.

FIG. 2 is a schematic diagram of a second signal according to an exemplary embodiment of the present disclosure. Please refer to FIG. 2, the signal S_2 may include a low frequency signal and a high frequency signal. The voltage level V_Center is used to represent the oscillation center voltage of the signal S_2.

In an exemplary embodiment, the voltage level Vth_Data is used to represent the voltage value of the signal S_Ref(1), and the voltage level Vth_Error is used to represent the voltage value of the signal S_Ref(2). The voltage level Vth_Error is higher than the voltage level Vth_Data, indicating that the voltage value of the signal S_Ref(2) is higher than the voltage value of the signal S_Ref(1). In this exemplary embodiment, the voltage level Vth_Error is farther from the voltage level V_Center than the voltage level Vth_Data.

In an exemplary embodiment, the voltage level Vth_Data' is used to represent the voltage value of the signal S_Ref(1), and the voltage level Vth_Error' is used to represent the voltage value of the signal S_Ref(2). The voltage level Vth_Error' is lower than the voltage level Vth_Data', indicating that the voltage value of the signal S_Ref(2) is lower than the voltage value of the signal S_Ref(1). In this exemplary embodiment, the voltage level Vth_Error' is farther from the voltage level V_Center than the voltage level Vth_Data'.

Please return to FIG. 1, in an exemplary embodiment, the calibration control circuit 103 includes a comparison circuit 1031 and a decision circuit 1032. The comparison circuit 1031 is coupled to the equalizer circuit 101, the clock and data recovery circuit 102, and the reference signal adjustment circuit 104. The decision circuit 1032 is coupled to the comparison circuit 1031 and the equalizer circuit 101. The comparison circuit 1031 can compare the signal S_Ref(2) with the signal S_2 according to the signal S_Clk and generate the signal S_Error. For example, the signal S_Error may reflect that the voltage value of the signal S_2 is higher or lower than the voltage value of the signal S_Ref(2) in each comparison. The comparison circuit 1031 can transmit the signal S_Error to the decision circuit 1032 according to the comparison result. The decision circuit 1032 can determine a count value according to the signal S_Error. This count value can reflect a total number of sampled value(s) of a specific type (also called a first sampled value) in the signal S_Error. The decision circuit 1032 can adjust the control parameter according to the count value.

In an exemplary embodiment, assuming that the voltage value of the signal S_Ref(2) (i.e., Vth_Error) is higher than the voltage value of the signal S_Ref(1) (i.e., Vth_Data), the first sampled value is a sampled value of "1". Taking FIG.

2 as an example, in a case that the signal S_2 is sampled according to the voltage value of the signal S_Ref(2) (i.e., Vth_Error), if the voltage value of the signal S_2 is higher than the voltage value of the signal S_Ref(2), then the sampled value obtained is "1". Conversely, if the voltage value of the signal S_2 is lower than the voltage value of the signal S_Ref(2), then the obtained sample value is "0". Therefore, in an exemplary embodiment where the voltage value of the signal S_Ref(2) (i.e., Vth_Error) is higher than the voltage value of the signal S_Ref(1) (i.e., Vth_Data), the accumulated count value can reflect that, in the consecutive N times of sampling of the signal S_2, the number of times the voltage value of the signal S_2 is higher than the voltage value of the signal S_Ref(2).

In an exemplary embodiment, assuming that the voltage value of the signal S_Ref(2) (i.e., Vth_Error') is lower than the voltage value of the signal S_Ref(1) (i.e., Vth_Data'), the first sample value is a sampled value of "0". Taking FIG. 2 as an example, in a case that the signal S_2 is sampled according to the voltage value of the signal S_Ref(2) (i.e., Vth_Error'), if the voltage value of the signal S_2 is higher than the voltage value of the signal S_Ref(2), then the sampled value obtained is "1". Conversely, if the voltage value of the signal S_2 is lower than the voltage value of the signal S_Ref(2), the obtained sampled value is "0". Therefore, in an exemplary embodiment where the voltage value of the signal S_Ref(2) (i.e., Vth_Error') is lower than the voltage value of the signal S_Ref(1) (i.e., Vth_Data'), the accumulated count value can reflect that, in the consecutive N times of sampling of the signal S_2, the number of times the voltage value of the signal S_2 is lower than the voltage value of the signal S_Ref(2).

In an exemplary embodiment, the decision circuit 1032 may analyze the N sampled values in the signal S_Error to obtain the count value. The count value may reflect the distribution and/or statistical characteristics of the sampling results of the N sampled values. After analyzing the N sampled values, if the count value does not meet a default condition, the decision circuit 1032 can reset the count value (for example, reset the count value to zero) and instruct the equalizer circuit 101 to adjust the control parameter. After adjusting the control parameter, the decision circuit 1032 can re-analyze the N sampled values in the newly generated signal S_Error and obtain a new count value. If the count value still does not meet the default condition, the decision circuit 1032 can reset the count value again and instruct the equalizer circuit 101 to adjust the control parameter again. In addition, if the count value meets the default condition, the decision circuit 1032 can determine that the calibration of the equalizer circuit 101 is completed and then record the control parameter currently used by the equalizer circuit 101. For example, the control parameter recorded in response to the count value meeting the default condition may be determined as the control parameter most suitable for the current channel state.

In an exemplary embodiment, after analyzing the N sampled values, the decision circuit 1032 can determine whether the obtained count value is greater than or equal to a default value. For example, the default value can be 5 or other positive integers. If the count value is greater than or equal to the default value, the decision circuit 1032 can determine that the count value meets the default condition and can stop the calibration of the equalizer circuit 101. In addition, if the count value is less than the default value, the decision circuit 1032 can determine that the count value does not meet the default condition and can continue to calibrate the equalizer circuit 101.

In an exemplary embodiment, the decision circuit 1032 can adjust a low frequency gain (such as the VGA parameter) or a high frequency gain (such as the HFPK parameter and/or the LFPK parameter) of the equalizer circuit 101 through the signal S_Adj. For example, for the low frequency signal in FIG. 2, at the beginning of calibration, the decision circuit 1032 can first set the low frequency gain of the equalizer circuit 101 to the lowest. Then, in the process of the calibration of the equalizer circuit 101, the decision circuit 1032 can gradually increase the low frequency gain of the equalizer circuit 101 to improve the signal quality of the low frequency signal in the signal S_2. Similarly, for the high frequency signal in FIG. 2, at the beginning of calibration, the decision circuit 1032 can first set the high frequency gain of the equalizer circuit 101 to the lowest. Then, in the process of the calibration of the equalizer circuit 101, the decision circuit 1032 can gradually increase the high frequency gain of the equalizer circuit 101 to improve the signal quality of the high frequency signal in the signal S_2.

In an exemplary embodiment, the decision circuit 1032 can determine whether the current signal S_1 (or S_2) is a low frequency signal or a high frequency signal according to the signal S_Data. If it is determined that the signal S_1 (or S_2) is the low frequency signal, in the process of the calibration of the equalizer circuit 101, the decision circuit 1032 can adjust (e.g., gradually increase) the low frequency gain of the equalizer circuit 101 according to the low frequency signal. Alternatively, if it is determined that the signal S_1 (or S_2) is the high frequency signal, in the process of the calibration of the equalizer circuit 101, the decision circuit 1032 can adjust (e.g., gradually increase) the high frequency gain of the equalizer circuit 101 according to the high frequency signal.

In an exemplary embodiment, the decision circuit 1032 can determine whether the current signal S_1 (or S_2) is the low frequency signal or the high frequency signal according to whether the sampling result presented by the signal S_Data is a low transition or a high transition. If the sampling result presented by the signal S_Data is low transition (that is, the sampling result presented by the signal S_Data contains multiple consecutive "1" or multiple consecutive "0"), it indicates that the transition speed of the signal S_2 is slower, so the decision circuit 1032 can determine that the current signal S_1 (or S_2) is a low frequency signal. Conversely, if the sampling result presented by the signal S_Data is high transition (that is, the sampling result presented by the signal S_Data contains multiple non-continuous "1" or multiple non-continuous "0"), it indicates that the transition speed of the signal S_2 is faster, so the decision circuit 1032 can determine that the current signal S_1 (or S_2) is a high frequency signal.

In an exemplary embodiment, the decision circuit 1032 can obtain the low frequency signal or the high frequency signal of FIG. 2 from the signal S_1 (or S_2) according to the signal S_Data (for example, the sampling result presented by the signal S_Data is low transition or high transition). If the obtained signal is the low frequency signal (for example, the sampling result presented by the signal S_Data is low transition), in the process of the calibration of the equalizer circuit 101, the decision circuit 1032 can use this low frequency signal to adjust (e.g., gradually increase) the low frequency gain of the equalizer circuit 101. Alternatively, if the obtained signal is the high frequency signal (for example, the sampling result presented by the signal S_Data is high transition), in the process of the calibration of the equalizer circuit 101, the decision circuit 1032 can use this high frequency signal to adjust (e.g., gradually increase) the high frequency gain of the equalizer circuit 101.

In an exemplary embodiment, the decision circuit 1032 can also determine whether the current signal S_1 (or S_2) is a low frequency signal or a high frequency signal according to whether the sampling result presented by the signal S_Error is low transition or high transition. If the sampling result presented by the signal S_Error is low transition (that is, the sampling result presented by the signal S_Error contains multiple consecutive "1" or multiple consecutive "0"), it indicates that the transition speed of the signal S_2 is slower, so the decision circuit 1032 can determine that the current signal S_1 (or S_2) is a low frequency signal. Conversely, if the sampling result presented by the signal S_Error is high transition (that is, the sampling result presented by the signal S_Error contains multiple non-continuous "1" or multiple non-continuous "0"), it indicates that the transition speed of the signal S_2 is faster, so the decision circuit 1032 can determine that the current signal S_1 (or S_2) is a high frequency signal.

It should be noted that the arrangement and coupling of all circuit modules in the signal receiving circuit 10 are examples, and are not intended to limit the present disclosure. In other exemplary embodiments, the arrangement and coupling of all circuit modules in the signal receiving circuit 10 can be adjusted according to practical requirements. In addition, in other exemplary embodiments, more useful circuit modules and/or electronic components can be added to the signal receiving circuit 10 or used to replace specific circuit modules and/or electronic components in the signal receiving circuit 10, depending on practical needs.

In an exemplary embodiment, the signal receiving circuit 10 may be disposed in a memory storage device to receive the signal S_1 from a host system. However, in another exemplary embodiment, the signal receiving circuit 10 can also be disposed in other types of electronic devices, not limited to the memory storage device.

Figure 3:
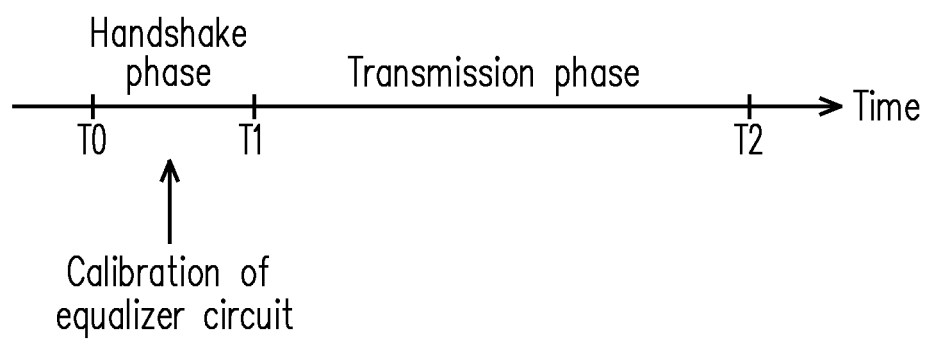
FIG. 3 is a schematic diagram of timing of calibration of an equalizer circuit according to exemplary embodiments of the present disclosure.

FIG. 3 is a schematic diagram of timing of calibration of an equalizer circuit according to some exemplary embodiments of the present disclosure. Please refer to FIG. 1 and FIG. 3, in an exemplary embodiment, the calibration operation of the equalizer circuit 101 can be performed in a handshake phase between the memory storage device and the host system (that is, between time points T0 to T1). In this handshaking phase, the memory storage device and the host system will transmit initial signals (also called handshaking signals) to each other to establish a connection. In other words, in the exemplary embodiment of FIG. 3, the signal S_1 transmitted in FIG. 1 includes the initial signals used to establish the connection between the host system and the memory storage device in the handshaking phase. After completing the handshaking phase (that is, after the time point T1), a transmission phase (that is, between the time point T1 and T2) can be entered. In the transmission phase, the memory storage device can use the equalizer circuit 101 that has been calibrated to modulate the data signal from the host system. In an exemplary embodiment, during the handshaking phase, the calibration operation of the equalizer circuit 101 can be perform on the low frequency signal and the high frequency signal in the signal S_1 respectively. For example, in an exemplary embodiment, the calibration operation of the equalizer circuit 101 may first perform calibration based on the low frequency signal in the signal S_1, and then perform calibration based on the high frequency signal in the signal S_1. Alternatively, in an exemplary embodiment, the calibration operation of the equalizer circuit 101 may first perform calibration based on the high frequency signal in the signal S_1, and then perform calibration based on the low frequency signal in the signal S_1.

In an exemplary embodiment, a memory storage device (also referred to as a memory storage system) includes a rewritable non-volatile memory module and a controller (also referred to as a control circuit). Usually the memory storage device is used with the host system so that the host system can write data to the memory storage device or read data from the memory storage device.

Figure 4:
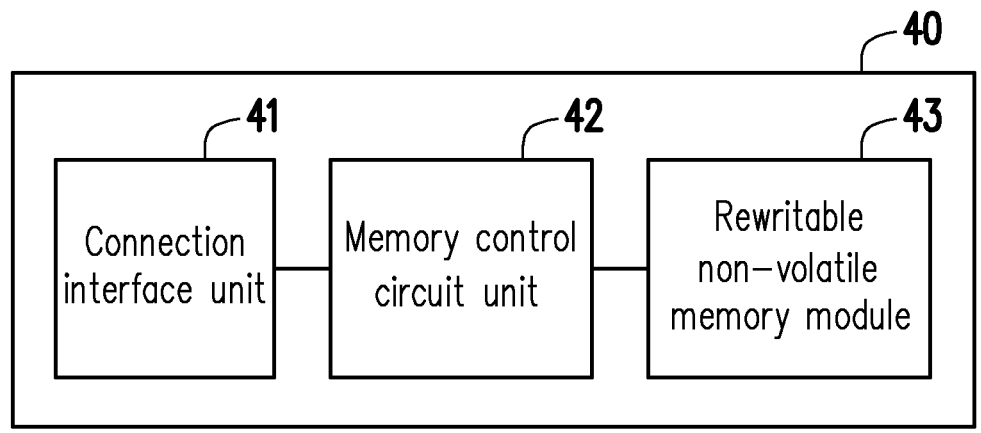
FIG. 4 is a schematic block diagram of a memory storage device according to an exemplary embodiment of the present disclosure.

FIG. 4 is a schematic diagram of a memory storage device according to an exemplary embodiment of the present disclosure. Please refer to FIG. 4, a memory storage device 40 includes a connection interface unit 41, a memory control circuit unit 42, and a rewritable non-volatile memory module 43. The signal receiving circuit 10 of FIG. 1 may be disposed in the connection interface unit 41, the memory control circuit unit 42, and/or the rewritable non-volatile memory module 43.

The connection interface unit 41 is configured to couple to the memory storage device 40 to a host system. The memory storage device 40 may communicate with the host system through the connection interface unit 41. In an exemplary embodiment, the connection interface unit 41 is compatible with a SATA (Serial Advanced Technology Attachment) standard. Nevertheless, it should be understood that the disclosure is not limited in this regard. The connection interface unit 41 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 41 and the memory control circuit unit 42 may be packaged into one chip, or the connection interface unit 41 is distributed outside of a chip containing the memory control circuit unit 42.

The memory control circuit unit 42 is configured to execute a plurality of logic gates or control commands which are implemented in a hardware form or in a firmware form and perform operations of writing, reading or erasing data in the rewritable non-volatile memory module 43 according to the commands of the host system.

The rewritable non-volatile memory module 43 is coupled to the memory control circuit unit 42 and configured to store data written from the host system. The rewritable non-volatile memory module 43 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quad Level Cell) NAND-type flash memory module (i.e., a flash memory module capable of storing four bits in one memory cell), other flash memory modules or other memory modules having the same features.

In the rewritable non-volatile memory module 43, one or more bits are stored by changing a voltage (hereinafter, also known as a threshold voltage) of each of the memory cells.

More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 43 can have a plurality of storage states. The storage state to which the memory cell belongs may be determined by applying a read voltage to the memory cell, so as to obtain the one or more bits stored in the memory cell.

In an exemplary embodiment, the memory cells of the rewritable non-volatile memory module 43 can constitute a plurality of physical programming units, and the physical programming units can constitute a plurality of physical erasing units. Specifically, the memory cells on the same word line can constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In an exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units can include a data bit area and a redundancy bit area. The data bit area contains multiple physical sectors configured to store user data, and the redundant bit area is configured to store system data (e.g., management data such as an error correcting code, etc.). In an exemplary embodiment, the data bit area contains 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
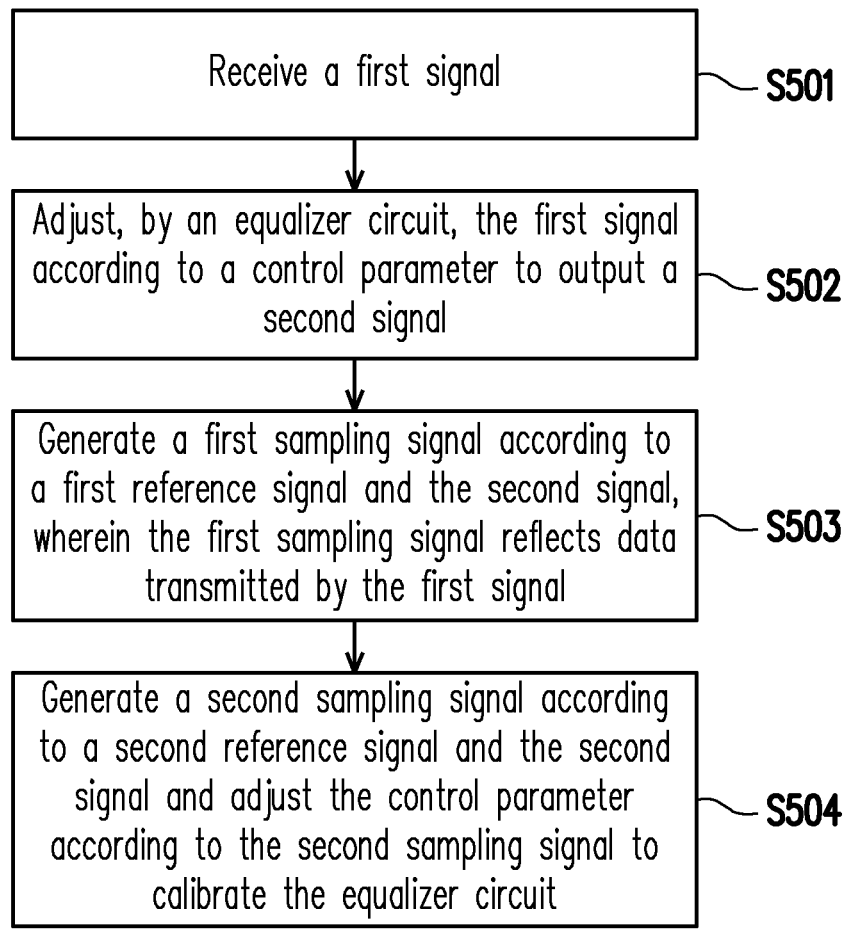
FIG. 5 is a flowchart of a calibration method of an equalizer circuit according to an exemplary embodiment of the present disclosure.

FIG. 5 is a flowchart of a calibration method of an equalizer circuit according to an exemplary embodiment of the present disclosure. Please refer to FIG. 5, in a step S501, a first signal is received. In a step S502, the first signal is adjusted, by an equalizer circuit, according to a control parameter and a second signal is output. In a step S503, a first sampling signal is generated according to a first reference signal and the second signal, wherein the first sampling signal reflects data transmitted by the first signal. In a step S504, a second sampling signal is generated according to a second reference signal and the second signal, and the control parameter is adjusted according to the second sampling signal, so as to calibrate the equalizer circuit. In particular, a voltage value of the first reference signal is different from a voltage value of the second reference signal.

Figure 6:
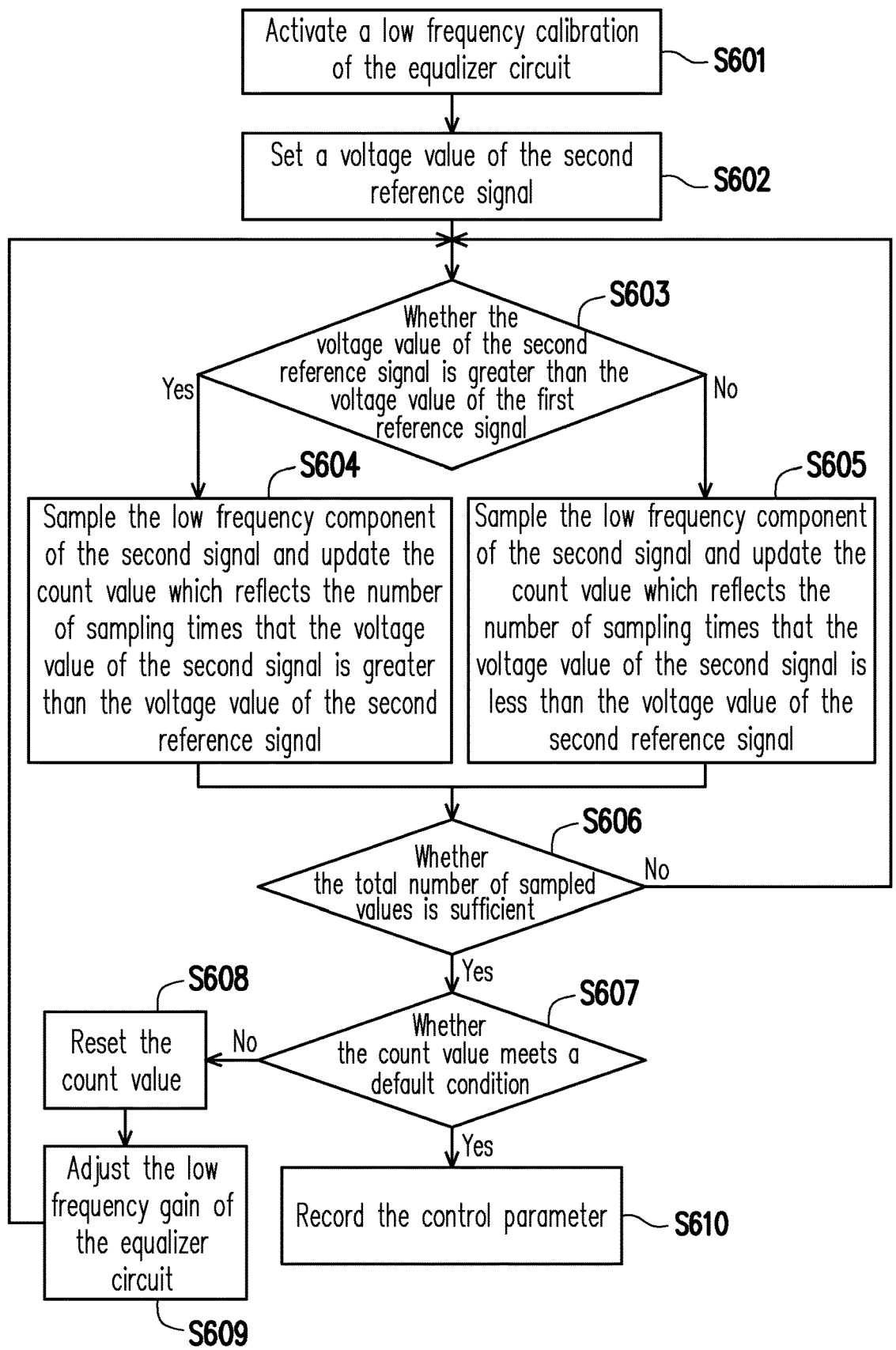
FIG. 6 is a flowchart of a calibration method of an equalizer circuit according to an exemplary embodiment of the present disclosure.

FIG. 6 is a flowchart of a calibration method of an equalizer circuit according to an exemplary embodiment of the present disclosure. Please refer to FIG. 6, in a step S601, a low frequency calibration of the equalizer circuit is activated. In a step S602, a voltage value of the second reference signal is set. Taking FIG. 2 as an example, the voltage value of the second reference signal can be set to the voltage level Vth_Error or Vth_Error'. In a step S603, it is determined whether the voltage value of the second reference signal is greater than the voltage value of the first reference signal. If the voltage value of the second reference signal is greater than the voltage value of the first reference signal, it indicates that the voltage values of the second reference signal and the first reference signal are set to Vth_Error and Vth_Data in FIG. 2, respectively, in the current calibration operation. In a step S604, the low frequency component of the second signal is sampled and the count value is updated. In particular, the count value recorded in the step S604 may reflect the number of sampling times that the voltage value of the second signal is greater than the voltage value of the second reference signal.

On the other hand, if the voltage value of the second reference signal is not greater than the voltage value of the first reference signal, it indicates that the voltage values of the second reference signal and the first reference signal are set to Vth_Error' and Vth_Data' in FIG. 2, respectively, in the current calibration operation. In a step S605, the low frequency component of the second signal is sampled and the count value is updated. In particular, the count value recorded in the step S605 can reflect the number of sampling times that the voltage value of the second signal is less than the voltage value of the second reference signal.

In a step S606, it is determined whether the total number of sampled values is sufficient. For example, assuming that N sampled values need to be collected by default, then the total number of the sampled values must be greater than or equal to N. If the total number of the sampled values is insufficient, steps S603 and S604 (or S605) can be repeated to continuously collect sampled values. If the total number of the sampled values is sufficient (for example, N sampled values have been collected), in a step S607, it is determined whether the accumulated count value meets a default condition. If the count value does not meet the default condition, in a step S608, the count value is reset, and in a step S609, the low frequency gain (such as the VGA parameter) and/or other control parameters of the equalizer circuit can be adjusted. Alternatively, if the count value meets the default condition, in a step S610, it is determined that the low frequency calibration for the equalizer circuit is completed and the current control parameter may be recorded.

Figure 7:
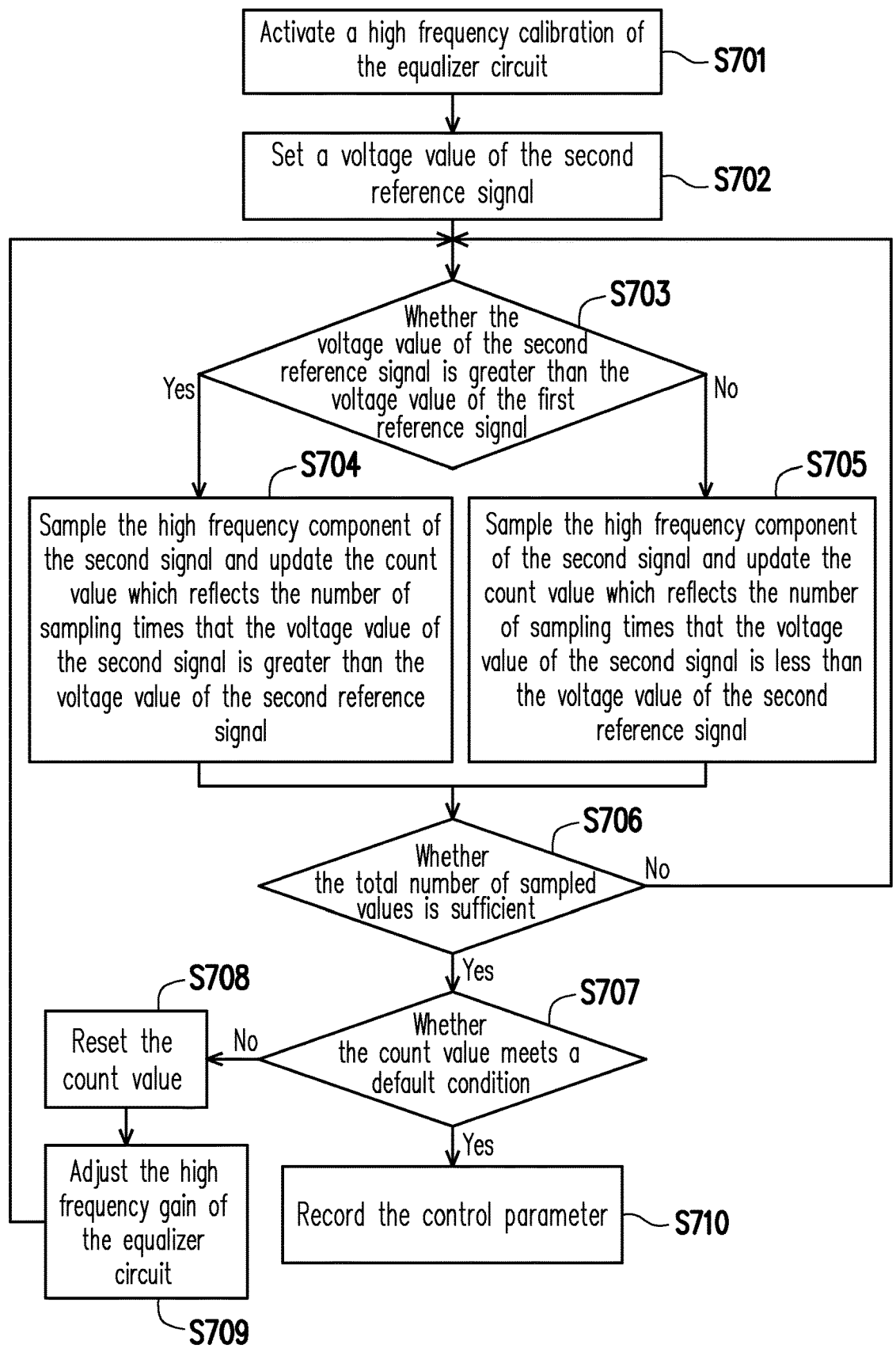
FIG. 7 is a flowchart of a calibration method of an equalizer circuit according to an exemplary embodiment of the present disclosure.

FIG. 7 is a flowchart of a calibration method of an equalizer circuit according to an exemplary embodiment of the present disclosure. Please refer to FIG. 7, in a step S701, a high frequency calibration of the equalizer circuit is activated. In a step S702, a voltage value of the second reference signal is set. Taking FIG. 2 as an example, the voltage value of the second reference signal can be set to the voltage level Vth_Error or Vth_Error'. In a step S703, it is determined whether the voltage value of the second reference signal is greater than the voltage value of the first reference signal. If the voltage value of the second reference signal is greater than the voltage value of the first reference signal, it indicates that the voltage values of the second reference signal and the first reference signal are set to Vth_Error and Vth_Data in FIG. 2, respectively, in the current calibration operation. In a step S704, the high frequency component of the second signal is sampled and the count value is updated. In particular, the count value recorded in the step S704 may reflect the number of sampling times that the voltage value of the second signal is greater than the voltage value of the second reference signal.

On the other hand, if the voltage value of the second reference signal is not greater than the voltage value of the first reference signal, it indicates that the voltage values of the second reference signal and the first reference signal are set to Vth_Error' and Vth_Data' in FIG. 2, respectively, in the current calibration operation. In a step S705, the high frequency component of the second signal is sampled and the count value is updated. In particular, the count value recorded in the step S705 can reflect the number of sampling times that the voltage value of the second signal is less than the voltage value of the second reference signal.

In a step S706, it is determined whether the total number of sampled values is sufficient. For example, assuming that N sampled values need to be collected by default, then the total number of the sampled values must be greater than or equal to N. If the total number of the sampled values is insufficient, steps S703 and S704 (or S705) can be repeated to continuously collect sampled values. If the total number of the sampled values is sufficient (for example, N sampled values have been collected), in a step S707, it is determined whether the accumulated count value meets a default condition. If the count value does not meet the default condition, in a step S708, the count value is reset, and in a step S709, the high frequency gain (such as the HFPK and LFPK parameters) and/or other control parameters of the equalizer circuit can be adjusted. Alternatively, if the count value meets the default condition, in a step S710, it is determined that the high frequency calibration for the equalizer circuit is completed and the current control parameter may be recorded.

It should be noted that in the exemplary embodiments of FIG. 6 and FIG. 7, the low frequency calibration or the high frequency calibration for the equalizer circuit to be activated currently can be determined based on whether the current second signal is a low frequency signal or a high frequency signal. Regarding the operation of identifying the current second signal as the low frequency signal or the high frequency signal, please refer to the description of the foregoing exemplary embodiment, which will not be repeated here.

Nevertheless, steps depicted in FIG. 5 to FIG. 7 are described in detail as above so that related description thereof is omitted hereinafter. It should be noted that, the steps depicted in FIG. 5 to FIG. 7 may be implemented as a plurality of program codes or circuits, which are not particularly limited in the disclosure. Moreover, the method disclosed in FIG. 5 to FIG. 7 may be implemented by reference with above exemplary embodiments, or may be implemented separately, which are not particularly limited in the disclosure.

In summary, in the exemplary embodiments of the disclosure, the information indicating whether the first signal (or the second signal) is the high frequency signal (with high transition) or the low frequency signal (with low transition) and the information indicating whether the calibration for the equalizer circuit is completed can be obtained based on the sampling statistical characteristics of the first sampling signal and/or the second sampling signal being generated by sampling. Compared with the traditional complex calibration circuit that needs to be additionally configured, the circuit structure of the signal receiving circuit provided by the exemplary embodiments of the present disclosure is simpler and can effectively improve the calibration efficiency of the equalizer circuit.

The previously described exemplary embodiments of the present disclosure have the advantages aforementioned, wherein the advantages aforementioned not required in all versions of the disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A signal receiving circuit comprising:
   an equalizer circuit configured to receive a first signal and adjust the first signal according to a control parameter to output a second signal;
   a clock and data recovery circuit coupled to the equalizer circuit and configured to generate a first sampling signal according to a first reference signal and the second signal, wherein the first sampling signal reflects data transmitted by the first signal; and
   a calibration control circuit coupled to the equalizer circuit and the clock and data recovery circuit,
   wherein the calibration control circuit is configured to generate a second sampling signal according to a second reference signal and the second signal and adjust the control parameter according to the second sampling signal to calibrate the equalizer circuit, and
   wherein a voltage value of the first reference signal is different from a voltage value of the second reference signal,
   wherein the operation of adjusting the control parameter by the calibration control circuit comprises:
   adjusting a low frequency gain of the equalizer circuit or a high frequency gain of the equalizer circuit.

2. The signal receiving circuit according to claim 1, wherein the calibration control circuit comprises:
   a comparison circuit configured to compare the second reference signal and the second signal to generate the second sampling signal; and
   a decision circuit coupled to the comparison circuit and configured to determine a count value according to the second sampling signal, wherein the count value reflects a total number of a first sampled value in the second sampling signal, and
   the decision circuit is further configured to adjust the control parameter according to the count value.

3. The signal receiving circuit according to claim 2, wherein the operation of adjusting the control parameter according to the count value by the decision circuit comprises:
   after N sampled values in the second sampling signal are analyzed, if the count value does not meet a default condition, resetting the count value and adjusting the control parameter; and
   after the N sampled values in the second sampling signal are analyzed, if the count value meets the default condition, recording the control parameter.

4. The signal receiving circuit according to claim 1, wherein the operation of adjusting the low frequency gain of the equalizer circuit or the high frequency gain of the equalizer circuit by the calibration control circuit comprises:

determining whether the first signal is a low frequency signal or a high frequency signal according to the first sampling signal;

if the first signal is the low frequency signal, adjusting the low frequency gain of the equalizer circuit; and if the first signal is the high frequency signal, adjusting the high frequency gain of the equalizer circuit.

5. The signal receiving circuit according to claim 1, wherein the operation of adjusting the low frequency gain of the equalizer circuit or the high frequency gain of the equalizer circuit by the calibration control circuit comprises:

obtaining a low frequency signal according to the first sampling signal;

adjusting the low frequency gain of the equalizer circuit according to the low frequency signal;

obtaining a high frequency signal according to the first sampling signal; and adjusting the high frequency gain of the equalizer circuit according to the high frequency signal.

6. The signal receiving circuit according to claim 1, further comprising:

a reference signal adjustment circuit coupled to the calibration control circuit and configured to adjust the voltage value of the second reference signal.

7. The signal receiving circuit according to claim 1, wherein the voltage value of the second reference signal is farther away from an oscillation center voltage of the second signal than the voltage value of the first reference signal.

8. A memory storage device comprising:

a connection interface unit configured to couple a host system;

a rewritable non-volatile memory module;

a memory control circuit unit coupled to the connection interface unit and the rewritable non-volatile memory module; and a signal receiving circuit disposed in the connection interface unit, wherein the signal receiving circuit comprises an equalizer circuit and the signal receiving circuit is configured to receive a first signal, the equalizer circuit is configured to adjust the first signal according to a control parameter to output a second signal, the signal receiving circuit is further configured to generate a first sampling signal according to a first reference signal and the second signal, wherein the first sampling signal reflects data transmitted by the first signal, the signal receiving circuit is further configured to generate a second sampling signal according to a second reference signal and the second signal and adjust the control parameter according to the second sampling signal to calibrate the equalizer circuit, and wherein a voltage value of the first reference signal is different from a voltage value of the second reference signal, wherein the operation of adjusting the control parameter by the signal receiving circuit comprises:

adjusting a low frequency gain of the equalizer circuit or a high frequency gain of the equalizer circuit.

9. The memory storage device according to claim 8, wherein the signal receiving circuit further comprises:

a comparison circuit configured to compare the second reference signal and the second signal to generate the second sampling signal; and a decision circuit coupled to the comparison circuit and configured to determine a count value according to the second sampling signal, wherein the count value reflects a total number of a first sampled value in the second sampling signal, and the decision circuit is further configured to adjust the control parameter according to the count value.

10. The memory storage device according to claim 9, wherein the operation of adjusting the control parameter according to the count value by the decision circuit comprises:

after N sampled values in the second sampling signal are analyzed, if the count value does not meet a default condition, resetting the count value and adjusting the control parameter; and after the N sampled values in the second sampling signal are analyzed, if the count value meets the default condition, recording the control parameter.

11. The memory storage device according to claim 8, wherein the operation of adjusting the low frequency gain of the equalizer circuit or the high frequency gain of the equalizer circuit by the signal receiving circuit comprises:

determining whether the first signal is a low frequency signal or a high frequency signal according to the first sampling signal;

if the first signal is the low frequency signal, adjusting the low frequency gain of the equalizer circuit; and if the first signal is the high frequency signal, adjusting the high frequency gain of the equalizer circuit.

12. The memory storage device according to claim 8, wherein the operation of adjusting the low frequency gain of the equalizer circuit or the high frequency gain of the equalizer circuit by the signal receiving circuit comprises:

obtaining a low frequency signal according to the first sampling signal;

adjusting the low frequency gain of the equalizer circuit according to the low frequency signal;

obtaining a high frequency signal according to the first sampling signal; and adjusting the high frequency gain of the equalizer circuit according to the high frequency signal.

13. The memory storage device according to claim 8, wherein the signal receiving circuit is further configured to adjust the voltage value of the second reference signal.

14. The memory storage device according to claim 8, wherein the voltage value of the second reference signal is farther away from an oscillation center voltage of the second signal than the voltage value of the first reference signal.

15. A calibration method of an equalizer circuit for a memory storage device, wherein the calibration method comprises:

receiving a first signal;

adjusting, by the equalizer circuit, the first signal according to a control parameter to output a second signal;

generating a first sampling signal according to a first reference signal and the second signal, wherein the first sampling signal reflects data transmitted by the first signal; and generating a second sampling signal according to a second reference signal and the second signal and adjusting the control parameter according to the second sampling signal to calibrate the equalizer circuit, wherein a voltage value of the first reference signal is different from a voltage value of the second reference signal, wherein the step of adjusting the control parameter comprises:

adjusting a low frequency gain of the equalizer circuit or a high frequency gain of the equalizer circuit.

16. The calibration method according to claim 15, wherein the step of generating the second sampling signal according to the second reference signal and the second signal and adjusting the control parameter according to the second sampling signal to calibrate the equalizer circuit comprises:
- comparing the second reference signal and the second signal to generate the second sampling signal;
- determining a count value according to the second sampling signal, wherein the count value reflects a total number of a first sampled value in the second sampling signal; and
- adjusting the control parameter according to the count value.

17. The calibration method according to claim 16, wherein the step of adjusting the control parameter according to the count value comprises:
- after N sampled values in the second sampling signal are analyzed, if the count value does not meet a default condition, resetting the count value and adjusting the control parameter; and
- after the N sampled values in the second sampling signal are analyzed, if the count value meets the default condition, recording the control parameter.

18. The calibration method according to claim 13, wherein the step of adjusting the low frequency gain of the equalizer circuit or the high frequency gain of the equalizer circuit comprises:
- determining whether the first signal is a low frequency signal or a high frequency signal according to the first sampling signal;
- if the first signal is the low frequency signal, adjusting the low frequency gain of the equalizer circuit; and
- if the first signal is the high frequency signal, adjusting the high frequency gain of the equalizer circuit.

19. The calibration method according to claim 15, wherein the step of adjusting the low frequency gain of the equalizer circuit or the high frequency gain of the equalizer circuit comprises:
- obtaining a low frequency signal according to the first sampling signal;
- adjusting the low frequency gain of the equalizer circuit according to the low frequency signal;
- obtaining a high frequency signal according to the first sampling signal; and
- adjusting the high frequency gain of the equalizer circuit according to the high frequency signal.

20. The calibration method according to claim 15, further comprising:
- adjusting the voltage value of the second reference signal by a reference signal adjustment circuit.

21. The calibration method according to claim 15, wherein the voltage value of the second reference signal is farther away from an oscillation center voltage of the second signal than the voltage value of the first reference signal.

\* \* \* \* \*